US007313585B2

(12) United States Patent
Winterrowd

(10) Patent No.: US 7,313,585 B2
(45) Date of Patent: Dec. 25, 2007

(54) MULTIPLIER CIRCUIT

(75) Inventor: Paul W. Winterrowd, Wellington, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 10/652,899

(22) Filed: Aug. 30, 2003

(65) Prior Publication Data

US 2005/0050134 A1    Mar. 3, 2005

(51) Int. Cl.
*G06F 7/533*    (2006.01)
(52) U.S. Cl. .................................................. 708/629
(58) Field of Classification Search ................. 708/629
See application file for complete search history.

(56) References Cited

U.S. PATENT DOCUMENTS

| | | | |
|---|---|---|---|
| 4,852,037 A | | 7/1989 | Aoki |
| 4,972,362 A | | 11/1990 | Elkind et al. |
| 5,070,502 A | | 12/1991 | Supnik |
| 5,181,185 A | | 1/1993 | Han et al. |
| 5,265,043 A | | 11/1993 | Naini et al. |
| 5,347,482 A | | 9/1994 | Williams |
| 5,504,915 A | | 4/1996 | Rarick |
| 5,754,459 A | | 5/1998 | Telikepalli |
| 5,808,928 A | * | 9/1998 | Miyoshi ..................... 708/628 |
| 5,867,415 A | | 2/1999 | Makino |
| 6,012,079 A | * | 1/2000 | Song ........................... 708/714 |
| 6,275,841 B1 | | 8/2001 | Potter et al. |
| 6,301,599 B1 | * | 10/2001 | Chehrazi et al. ............. 708/628 |
| 6,434,587 B1 | | 8/2002 | Liao et al. |
| 6,442,582 B1 | * | 8/2002 | Hale ........................... 708/629 |
| 6,460,064 B1 | | 10/2002 | Lee |
| 6,571,268 B1 | | 5/2003 | Giacalone et al. |
| 6,611,857 B1 | * | 8/2003 | Lemonds et al. ............. 708/629 |
| 6,692,534 B1 | * | 2/2004 | Wang et al. ................. 708/100 |

(Continued)

FOREIGN PATENT DOCUMENTS

JP    57199044 A    12/1982

(Continued)

OTHER PUBLICATIONS

Kwan, Manto, Comparison of Various Multipliers for Performance Issues, High Speed & Low Power ASIC 97.575, Mar. 24, 2003, Carleton University, Department of Electronics. http://web.doe.carleton.ca/ shams/97575/MantoPresentation.ppt.

Rabaey, Jan M., Chandrakasan, Anantha, Nikolic, Borivoje, Digital Integrated Circuits A Design Perspective, Arithmetic Circuits, Jan. 2003, http://bwrc.eecs.berkeley.edu/IcBook/Slides/chapter11.ppt.

Bohsali, Mounir, Doan, Michael, Design of Regularly Structured Wallace Tree Multipliers, http://www.eecs.berkeley.edu/ mounir/ee241/ee241.part2.pdf.

(Continued)

*Primary Examiner*—D. H. Malzahn

(57) ABSTRACT

A multiplier circuit is disclosed for multiplying a multiplicand by a multiplier. The multiplier circuit includes a partial product generator and a partial product adder. The partial product generator includes a first input to receive a multiplicand; a second input to receive a multiplier; partial product generation means for producing a plurality of partial products based on the multiplicand and the multiplier; and an output coupled to the partial product generation means to provide the plurality of partial products. The partial product adder includes an input coupled to the output of the partial product generator; a plurality of adders to add the plurality of partial products to produce a final product, the plurality of adders comprising a plurality of compressors having substantially the same width; and an output coupled to the plurality of adders to provide the final product.

39 Claims, 12 Drawing Sheets

U.S. PATENT DOCUMENTS

| | | |
|---|---|---|
| 2001/0009012 A1 | 7/2001 | Itoh |
| 2002/0116433 A1 | 8/2002 | Awaka et al. |
| 2002/0169812 A1 | 11/2002 | Orchard |

FOREIGN PATENT DOCUMENTS

| | | |
|---|---|---|
| JP | 62166424 A | 7/1987 |
| JP | 03214233 A | 9/1991 |
| JP | 03269724 A | 12/1991 |
| JP | 04153730 A | 5/1992 |
| JP | 06348457 A | 12/1994 |
| WO | WO91/19249 A1 | 12/1991 |
| WO | WO95/04964 A1 | 2/1995 |

OTHER PUBLICATIONS

Bohsali, Mounir, Doan, Michael, Rectangular Styled Wallace Tree Multipliers, http://www.eecs/berkeley.edu/ mounir/ee241/ee241_final_report.pdf.

Wallace, C.S. (1964). A suggestion for a fast multiplier. IEEE Transaction on Computers 13, 14—17.

A.D. Booth, A signed binary multiplication technique, Qt. J. Mech. Appl. 118 Math., vol. 4, Part 2, 1951.

* cited by examiner

| 110h | 110g | 110f | 110e | 110d | 110c | 110b | 110a | |
|---|---|---|---|---|---|---|---|---|
|  |  |  |  | 1 | 0 | 1 | 0 | }102 |
|  |  |  |  | 0 | 1 | 1 | 1 | }104 |
|  |  |  | 1 | 0 | 1 | 0 |  | }106a |
|  |  | 1 | 0 | 1 | 0 |  |  | }106b |
|  | 1 | 0 | 1 | 0 |  |  |  | }106c |
| 0 | 0 | 0 | 0 |  |  |  |  | }106d |
| 0 | 1 | 0 | 0 | 0 | 1 | 1 | 0 | }108 |

FIG. 1
(PRIOR ART)

| 110h | 110g | 110f | 110e | 110d | 110c | 110b | 110a | |
|---|---|---|---|---|---|---|---|---|
|  |  |  | 1 | 0 | 1 | 0 |  | }106a |
|  |  | 1 | 0 | 1 | 0 |  |  | }106b |
|  | 1 | 0 | 1 | 0 |  |  |  | }106c |
| 0 | 0 | 0 | 0 |  |  |  |  | }106d |
|  | 0 | 1 | 1 | 0 | 1 | 1 | 0 | }302 |
| 0 | 0 | 0 | 1 | 0 | 0 | 0 |  | }304 |
| 0 | 1 | 0 | 0 | 0 | 1 | 1 | 0 | }306 |

FIG. 3
(PRIOR ART)

MULTIPLIER CIRCUIT

BACKGROUND

1. Field of the Invention

The present invention relates to multiplier circuits for use in computer systems.

2. Related Art

Modern microprocessors and other integrated circuits typically include dedicated multiplier circuits for multiplying binary numbers. It is desirable that multiplier circuits be easy to design, capable of fitting in a small area, capable of performing multiplication quickly, and inexpensive to manufacture. Circuit designers continue to be challenged by these design goals as the need continues to increase for processors that are ever smaller, faster, and inexpensive. In particular, the movement toward processors with 64-bit architectures poses particular challenges for designers of multiplier circuits, since the rote application of old methodologies to such architectures may produce multiplier circuit designs that are large, complex, costly, slow, and time-consuming to lay out.

Multiplier circuits typically multiply binary numbers using the same general algorithm taught in elementary school. For example, referring to FIG. 1, a diagram is shown illustrating techniques that may be used to multiply a first binary operand 102 (referred to as the "multiplicand") by a second binary operand 104 (referred to as a "multiplier") using the "elementary school" algorithm. The multiplier 104 is written directly beneath the multiplicand 102, with the bits of the multiplicand 102 and multiplier 104 aligned in columns 110a–d. Each of the bits in the multiplier 104 is multiplied by all of the bits in the multiplicand 102 to produce partial products 106a–d, respectively. For example, the bit of multiplier 104 in column 110a is multiplied by the multiplicand 102 to produce partial product 106a, the bit of multiplier 104 in column lob is multiplied by the multiplicand 102 to produce partial product 106b, and so on.

Each successive one of the partial products 106a–d is shifted to the left by one column with respect to the previous one of the partial products 106a–d to facilitate the addition of the partial products 106a–d. In this arrangement, the partial products 106a–d span columns 110a–h. Thus arranged, the partial products 106a–d are added, thereby producing final product 108, which is the product of the multiplicand 102 and the multiplier 104.

Referring to FIG. 2, a functional block diagram is shown of a prior art system 200 for using a multiplier circuit 206 to multiply a binary multiplicand 204 by a binary multiplier 202. The term "multiplier circuit" is used herein to refer specifically to circuitry that performs multiplication, and thereby to avoid any ambiguities that may be raised by the use of the term "multiplier" to refer to one of the operands in a multiplication operation.

The multiplier circuit 206 includes a partial product generator 208 that receives the multiplier 202 and multiplicand 204 as inputs, and that produces as output a plurality of partial products 210. Various partial product generators are well-known to those of ordinary skill in the art and generally produce partial products in a manner similar to that described with respect to the "elementary school algorithm" of FIG. 1. The partial products 210 are provided to a partial product adder 212, which adds the partial products 210 to produce a final product 214 that is equal to the product of the multiplier 202 and the multiplicand 204.

In practice, the process of adding the partial products 110 is broken down into multiple stages. As also taught in elementary school, the process of adding two or more numbers may generate digits (or bits in the case of binary numbers) that need to be "carried" from one column to the next. The partial product adder 212 typically is implemented to perform carry operations in a manner that is more computationally efficient than the method typically taught in elementary school.

For example, referring to FIG. 3, a diagram is shown illustrating techniques that may be used by the partial product adder 212 to add the partial products 106a–d. The bits in each of the columns 110a are added to each other, beginning with column 110a and moving to the left. For example, the bits in column 110a are summed, producing a zero sum and a zero carry. This is reflected by the zero (representing the zero sum) in column 110a of a sum word 302 and the zero (representing the zero carry) in column 110b of a carry word 304. Note that the carry word 304 is shifted to the left by one bit position with respect to the sum word 302. The bits in columns 110b and 110c may be added in a similar manner, thereby producing sums without any carry. When the bits in column 110d are added, however, the result is zero with a carry of one. This is reflected by the value of zero in column 110d in the sum word 302 and the value of 1 in column 110e of the carry word 304. Bits in the remaining columns 110e–g are added in the same way to produce the remaining bits in the sum word 302 and carry word 304. Once the sum word 402 and carry word 304 are generated, they may be summed to produce a final product 306.

Referring to FIG. 4, a functional block diagram is shown of the high-level structure that typically is used to implement the partial product adder 212 to perform partial product addition in the manner illustrated in FIG. 3. The partial product adder 212 includes an adder array 402 that receives the partial products 210 and sums them, thereby generating a sum word 406 and a carry word 404. The sum word 406 and carry word 404 are provided to a full adder 408, which sums the sum word 406 and carry word 404, thereby producing the final product 214. One advantage of using the techniques illustrated in FIG. 4 is that the value of each bit in the carry word 404 depends only on the sum of the bits in a single one of the columns 110a–h (FIG. 3), thereby simplifying the implementation of the adder array 402 in comparison to techniques in which carry bits are propagated through the sum as it is generated. In the system illustrated in FIG. 4, only the final full adder 408 need perform an addition that requires carry propagation.

The time required to sum the partial products 210 may be reduced, for example, by: (1) reducing the number of partial products 210; and/or (2) increasing the speed with which the adder array 402 adds the partial products 210. One well-known technique that has been used to reduce the number of partial products 210 is referred to as Booth encoding, according to which the multiplier 202 is encoded in a manner that cuts the number of partial products 210 in half or more. In other words, if n is the number of bits in the multiplier 202, then radix-4 Booth encoding enables the number of partial products 210 to be reduced to n/2 and radix-8 Booth encoding enables the number of partial products 210 to be reduced to n/3. Booth encoding is described in more detail in "A Signed Binary Multiplication Technique," Andrew D. Booth, Quart. Journal Mech. and Applied Math., Vol. IV, part 2, 1951.

The adder array 402 may be implemented in various ways that are well-known to those of ordinary skill in the art. For example, referring to FIG. 5A, a functional block diagram is shown of a linear adder array 502 that may be used to implement the adder array 402. The linear adder array 502 adds nine partial products 504a–i (which are examples of the partial products 210) to produce the final product 214. The linear adder array 502 includes full adders 506a–g, each of which receives three binary numbers as inputs and produces a corresponding sum and carry word as outputs. In particular, full adder 506a receives partial products 504g–i as inputs, sums the partial products 504g–i, and produces a sum word 512a and a carry word 510a as outputs. Carry word 510a, sum word 512a, and the next partial product 504f are provided as inputs to the next full adder 506b, which produces a corresponding sum word 512b and carry word 510b as outputs.

The remaining partial products 504a–e are added to the running sum in the same manner, namely by providing them as inputs to the full adders 506c–g, which produce corresponding sum words 512c–g and carry words 510c–g. The final sum word 512g and carry word 510g are provided to the final full adder 408, which sums the sum word 512g and the carry word 510g to produce the final product 214. Although the layout and operation of the linear adder array 502 are straightforward, the size and calculation time of the linear adder array 502 increases linearly with the number of partial products, thereby making it poorly-suited to use in conjunction with the large number of partial products typically generated when multiplying large binary numbers.

Referring to FIG. 5B, a functional block diagram is shown of a parallel adder array 520 that may be used to implement the adder array 402. The parallel adder array 520 adds the nine partial products 504a–i to produce the final product 214. The parallel adder array 520 includes full adders 526a–g, each of which receives three binary numbers as inputs and produces a corresponding sum and carry word as outputs. In particular, full adder 506a receives partial products 504g–i as inputs, sums the partial products 504g–i, and produces a sum word 532a and a carry word 530a as outputs. Full adder 526d receives partial products 504a–c as inputs, sums the partial products 504a–c, and produces a sum word 532d and a carry word 530d as outputs. Because neither of the full adders 526a and 526d rely on each other's results for input, the full adders 526a and 526d may operate in parallel with each other.

Referring again to the left-hand side of FIG. 5B, partial product 504f and the outputs of full adder 526a are provided as input to full adder 526b, which produces a sum word 532b and a carry word 530b. Partial product 504e and the outputs of full adder 526b are provided as input to full adder 526c, which produces a sum word 532c and a carry word 530c. Referring back to the right-hand side of FIG. 5B, the partial-product 504d and the outputs of full adder 526d are provided as input to full adder 526e, which produces a sum word 532e and a carry word 530e.

Carry word 530c, sum word 532c, and carry word 530e are provided as inputs to a full adder 526f, which produces a sum word 532f and a carry word 530f. Sum word 532f, carry word 530f, and sum word 532e are provided as inputs to a full adder 526g, which produces a sum word 532g and a carry word 530g. The final full adder 408 sums the sum word 532g and the carry word 530g to produce the final product 214 . Although the parallel adder array 520 has a more complex layout than the linear adder array 502 shown in FIG. 5A, the parallel adder array 520 incurs fewer gate delays than the linear adder array 502 due to the ability of the parallel adder array 520 to perform certain additions in parallel with each other.

Referring to FIG. 5C, a functional block diagram is shown of another well-known adder array 540, referred to as a "Wallace tree" adder array, that may be used to implement the adder array 402. The Wallace tree adder array 540 sums the nine partial products 504a–i to produce the final product 214. The Wallace tree structure was first described in C.S. Wallace, "A Suggestion for a Fast Multiplier," IEEE Transactions on Electronic Computers, vol. EC-13, pp. 14–17, February 1964.

The Wallace tree adder array 540 includes full adders 546a–g, each of which receives three binary numbers as inputs and produces a corresponding sum and carry word as outputs. In particular, partial products 504g–i, 504d–f, and 504a–c are provided in parallel as inputs to full adders 546a, 546b, and 546c, respectively. Full adders 546a–c sum their inputs to produce sum words 552a–c and carry words 550a–c, respectively.

Full adder 546d sums the carry word 550a, the sum word 552a, and the carry word 550b to produce sum word 552d and carry word 550d. Full adder 546e sums the sum word 552b, the carry word 550a, and the sum word 552c to produce sum word 552e and carry word 550e. Full adder 546f sums the carry word 550d, the sum word 552d, and the carry word 550e to produce sum word 552f and carry word 550f. Finally, full adder 546g sums carry word 550f, sum word 552f, and sum word 552e to produce sum word 552g and carry word 550g.

The final full adder 408 sums the sum word 552g and the carry word 550g to produce the final product 214. The Wallace tree adder array 540 adds the partial products 504a–i with fewer gate delays (four) than either the linear adder array 502 (FIG. 5A) or the parallel adder array 520 (FIG. 5B). In general, the calculation time of the array 540 is in theory proportional to the logarithm of the number of bits in the multiplier 202. The structure of the Wallace tree adder array 540 is complex, however, making it difficult to lay out schematics for circuitry implementing a conventional Wallace tree quickly, easily, and efficiently. As a result of the Wallace tree's complex structure, circuits implementing Wallace trees tend to include long wiring paths. The signal propagation delays incurred on such paths can be significant enough to significantly mitigate or even negate the theoretical speed benefits of Wallace trees.

SUMMARY

In one aspect of the present invention, a multiplier circuit is provided that includes a partial product generator and a partial product adder. The partial product generator includes a first input to receive a multiplicand; a second input to receive a multiplier; partial product generation means for producing a plurality of partial products based on the multiplicand and the multiplier; and an output coupled to the partial product generation means to provide the plurality of partial products. The partial product adder includes an input coupled to the output of the partial product generator; a plurality of adders to add the plurality of partial products to produce a final product, the plurality of adders comprising a plurality of compressors having the same width; and an output coupled to the plurality of adders to provide the final product.

The plurality of adders may include an adder array and a full adder. The adder array may include a subset of the plurality of adders; a first output to produce a sum signal; and a second output to produce a carry signal. The subset of the plurality of adders may include a plurality of carry save adders to sum the plurality of partial products to produce the sum signal and the carry signal. The full adder may include a first input coupled to the first output of the adder array; a second input coupled to the second output of the adder array; means for adding the sum signal to the carry signal to produce the final product; and an output to provide the final product.

The multiplier and the multiplicand may, for example, be 64-bit binary numbers. The plurality of compressors may, for example, be interconnected in a Wallace tree configuration or a configuration that is similar to a Wallace tree configuration. The width of each compressor C in the plurality of compressors may be equal to the width of each of the inputs of compressor C. The plurality of compressors may, for example, be a plurality of 4-2 compressors.

In another aspect of the present invention, a circuit is provided that includes a plurality of compressors having a plurality of inputs and a plurality of outputs; a first compressor row including a first subset of the plurality of compressors, the inputs of the first subset of the plurality of compressors being wired in parallel to receive a plurality of distinct inputs; and a second compressor row including a second subset of the plurality of compressors, outputs of the first subset of the plurality of compressors being coupled to inputs of the second subset of the plurality of compressors; wherein all of the compressors in the plurality of compressors have substantially the same width. In one embodiment of the present invention, the width of any compressor C in the plurality of compressors does not differ substantially from the width of any other one of the plurality of compressors.

The circuit may include a third compressor row include a third subset of the plurality of compressors, outputs of the second subset of the plurality of compressors being coupled to inputs of the third subset of the plurality of compressors. The first compressor row may include a first compressor, a second compressor, and a third compressor, wherein the second compressor row comprises a fourth compressor, and wherein the third compressor row comprises a fifth compressor. Each of the plurality of compressors may, for example, be 72 bits wide.

In yet another aspect of the present invention, a circuit is provided that includes a plurality of compressors having a plurality of inputs a plurality of outputs; a first compressor row including a first subset of the plurality of compressors, the inputs of the first subset of the plurality of compressors being wired in parallel to receive a plurality of distinct inputs; and a second compressor row comprising a second subset of the plurality of compressors, outputs of the first subset of the plurality of compressors being coupled to inputs of the second subset of the plurality of compressors, wherein all of the compressors in the plurality of compressors have the same width.

In a further aspect of the present invention, a multiplier circuit is provided that includes a partial product generator and a partial product adder. The partial product generator includes a first input to receive a multiplicand, a second input to receive a multiplier; partial product generation means for producing a plurality of partial products based on the multiplicand and the multiplier; and an output coupled to the partial product generation means to provide the plurality of partial products. The partial product adder includes an input coupled to the output of the partial product generator; a plurality of adders to add the plurality of partial products to produce a final product, the plurality of adders including a plurality of compressors having substantially the same width; and an output coupled to the plurality of adders to provide the final product.

Other features and advantages of various aspects and embodiments of the present invention will become apparent from the following description and from the claims.

BRIEF DESCRIPTION OF THE DRAWINGS

FIG. 1 is a diagram illustrating the multiplication of two binary numbers using a prior art multiplication technique;

FIG. 3 is a diagram illustrating the summation of a plurality of binary partial products using a prior art addition technique;

DETAILED DESCRIPTION

Figure 6:
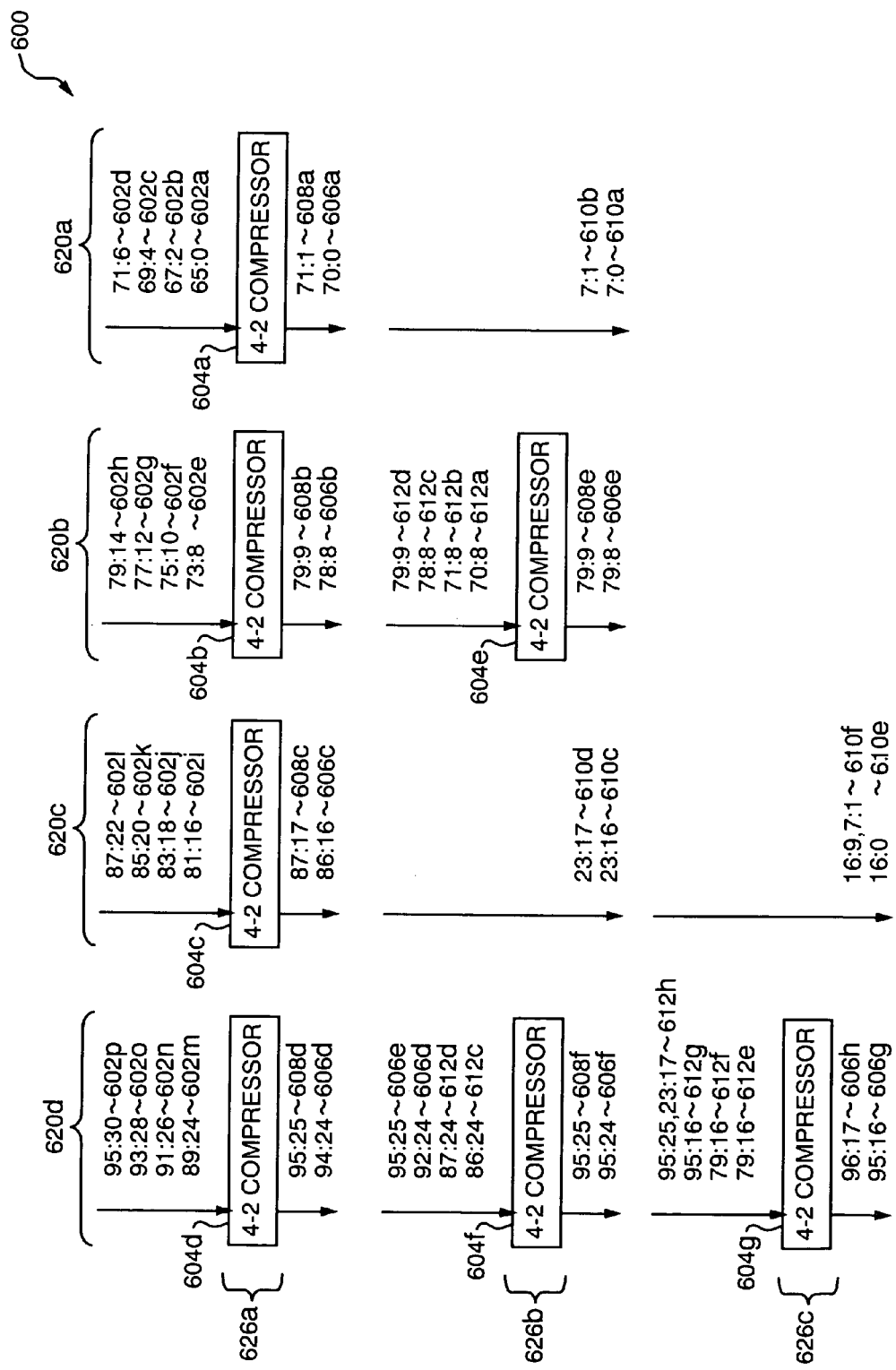
FIG. 6 is a diagram of a system including a Wallace tree adder array for adding sixteen partial products.

Before describing particular embodiments of the present invention, additional features of conventional Wallace trees will be described in more detail. Referring to FIG. 6, a diagram is shown of a system 600 in which a conventional Wallace tree structure is employed to sum 16 partial products 602a–p, each of which is 66 bits wide. Such products 602a–p may, for example, be one of two sets of partial products generated when a 64-bit multiplicand is multiplied by a 64-bit multiplier using radix-4 Booth encoding. As stated above, the partial products 602a–p are 66 bits wide rather than 64 bits wide because they are encoded using Booth encoding and sign extended one bit further to simplify the execution of signed and unsigned multiplication using the same multiplier circuit.

FIG. 6 illustrates each of the partial products 602a–p and other numerical values using the notation x:y, which specifies a binary number having a most significant bit at column x and a least significant bit at column y. The width of a binary number x:y is therefore equal to x−y+1. For example, partial product 602a is shown in FIG. 6 as "65:0", indicating that partial product 602a has a least significant bit at column 0 and a most significant bit at column 65, and is therefore 66 bits wide. Note that each of the partial products 602a–p is shifted by two columns with respect to the preceding partial product as a result of encoding the partial products 602a–p using Booth encoding.

The diagram shown in FIG. 6 illustrates a design produced in the "physical design" stage of circuit design. Once such a design is complete, the particular circuit elements (e.g., compressors, multiplexers, and wires) may be selected and laid out in the "layout" stage of circuit design. As will be described in more detail below, the complexity of the physical design may influence the difficulty of laying out circuitry for implementing the physical design.

The system 600 includes compressors 604a–g, distributed among three rows 626a–c. In particular, row 626a includes compressors 604a–d, row 626b includes compressors 604e–f, and row 626c includes compressor 604g. The compressors in each row may operate in parallel. In general, a compressor is a circuit that receives multiple inputs and reduces them into two outputs. A carry save adder (described in more detail below with respect to FIG. 7), which receives multiple numbers as inputs and sums them to produce a sum word and carry word as outputs, is an example of a compressor. The particular compressors 604a–g shown in FIG. 6 are 4-2 compressors, meaning that each of them receives four words as input and produces two words as output. In the particular example shown in FIG. 6, the first output of each of the compressors 604a–g is a sum word, while the second input is a carry word.

Techniques for implementing compressors are well-known to those of ordinary skill in the art. For example, referring to FIG. 7, a block diagram is shown of a 4-2 compressor 700 that may be used to implement one or more of the compressors 604a–g shown in FIG. 6 and other compressors described herein. The compressor 700 includes four numeric inputs 704a–d at which four binary numbers, such as partial products, may be received. The compressor 700 also includes a carry in input 706 at which the carry word that is output by a previous compressor, if any, is received. If the compressor 700 is not connected to a previous compressor, the carry in input 706 may be wired to a binary value of zero.

The compressor 700 includes two carry save adders 702a–b. As is well-known to those of ordinary skill in the art, a carry save adder receives three binary numbers as input and produces a sum word and carry word as output. In the embodiment illustrated in FIG. 7, the first carry save adder 702a includes three inputs 708a–c that are coupled to inputs 704a–c of the compressor 700, respectively. The carry save adder 702a adds the values provided at inputs 704a–c and produces a sum word at output 710a and a carry word at output 710b. The value produced at carry output 710b is provided as an output of the compressor 700 at carry out output 712.

The second carry save adder 702b includes three inputs 714a–c that are coupled to sum output 710a of carry save adder 702a, input 704d of compressor 700, and carry in input 706 of compressor 700, respectively. Carry save adder 702b adds the values provided at inputs 714a–c and produces a sum word at output 716a and a carry word at output 716b, which are provided at sum output 718a and carry output 718b of the compressor 700, respectively. The values at outputs 718a–b represent the sum and carry word that result when the inputs 704a–d and 706 of the compressor 700 are added.

Returning to FIG. 6, the system 600 is divided into four columns 620a–d. The partial products 602a–p are divided into four groups containing partial products 602a–d, 602e–h, 602i–l, and 602m–p, which are provided as inputs to compressors 604a–d, respectively. Compressors 604a–d and their respective inputs are distributed among the four columns 620a–d.

In the particular embodiment shown in FIG. 6, each of the compressors 604a–d is 71 bits wide, which means that each of the compressors is capable of receiving inputs that are as wide as 71 bits. If a particular partial product (such as partial product 602a) is less than 71 bits wide, such a partial product may be padded on the left (i.e., in its most significant bits) using zeros or by using the well-known technique of sign bit extension to pad the number if the number is represented in 2's complement representation.

The compressors 604a–d sum their inputs and produce corresponding sum words 606a–d and carry words 608a–d as outputs. In this way, the compressors 604a–d reduce the sixteen inputs to the system 600 (i.e., the partial products 602a–p) into eight words 606a–d and 608a–d.

Note that although each of the inputs to the compressors 604a–d is 66 bits wide, the outputs of the compressors 604a–d are 71 bits wide due to shifting of the partial products 602a–p with respect to each other. For example, referring back to FIG. 3, although each of the partial products 106a–d is four bits wide, the resulting sum word 302 and carry word 304 are each seven bits wide. For the same general reason, the sum word and carry word produced by summing four 66-bit Booth-encoded partial products is 71 bits wide, and the result of adding such a sum and carry word is 72 bits wide.

Figure 2:
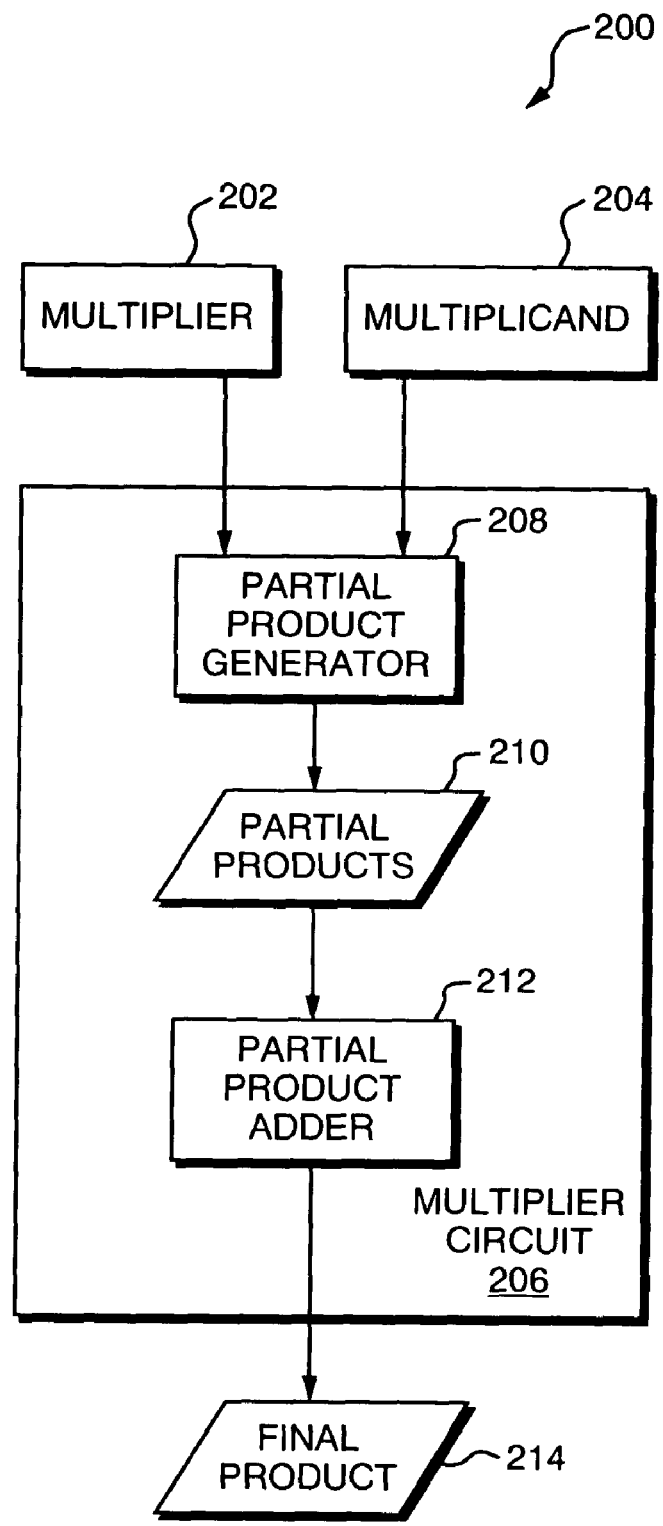
FIG. 2 is a functional block diagram of a prior art system for using a multiplier circuit to multiply two binary numbers.

Referring now to row 626b, each of the compressors 604e–f is 72 bits wide. Certain bits 610a–d of words 606a, 608a, 606c, and 608c are passed through row 626b without being input to the compressors 604e–f in row 626b. As described in more detail below, bits 610c–d are added in row 626c. Bits 610a–b, in contrast, are simply passed through the system 600 because it is not necessary to add them to any other bits. For example, referring again to FIG. 1, note that the bit of partial product 106a in column 110a does not need to be added to the bits of any other partial products 106b–d to produce the corresponding bit in column 110a of the final product 108. For the same reason, bits 610a of sum word 606a need not be added to any other bits to produce the corresponding bit in the final product 214 (FIG. 2). As a result, bits 610a may simply be passed through the system 600 and appended to the other bits of the final product 214. The same reasoning applies to other bits (such as bits 610b) that are passed through the system 600 and through other systems shown in the drawings.

Compressor 604e receives as input: (1) words 606b and 608b (produced by compressor 604b in row 626a), and (2) words 612a and 612b, which are produced by stripping least significant bits 610a and 610b from words 606a and 608a, respectively. Similarly, compressor 604f receives as input: (1) words 606d and 608d (produced by compressor 604d in row 626a), and (2) words 612c and 612d, which are produced by stripping least significant bits 610c and 610d from words 606c and 608c, respectively.

The compressors 604e–f sum their inputs and produce corresponding sum words 606e–f and carry words 608e–f as output. In this way, the compressors 604e–f reduce their eight inputs (i.e., words 612a–d, 606b, 606d, 608b, and 608d) into four words 606e–f and 608e–f. The outputs of the compressors 604e–f are 72 bits wide.

Referring now to row 626c, word 608f is combined with word 610d to produce word 612h. Word 606f is combined with word 610c to produce word 612g. Word 612f is formed by stripping bits 16:9 from word 608e. Bits 16:9 that are stripped from word 608e are combined with bits 610b to form bits 610f. Bits 16:8 are stripped from word 606e to form word 612e. Bits 610a are combined with bits 16:8 from word 606e to form bits 610e.

Words 612*h*, 612*g*, 612*f*, and 612*e* are provided as inputs to compressor 604*g* in row 626*c*. In the particular embodiment shown in FIG. 6, compressor 604*g* is 80 bits wide, to accommodate the full width (95:16) of its inputs. The compressor 604*g* sums its inputs and produces a corresponding sum word 606*g* and carry word 606*h* as output.

Figure 4:
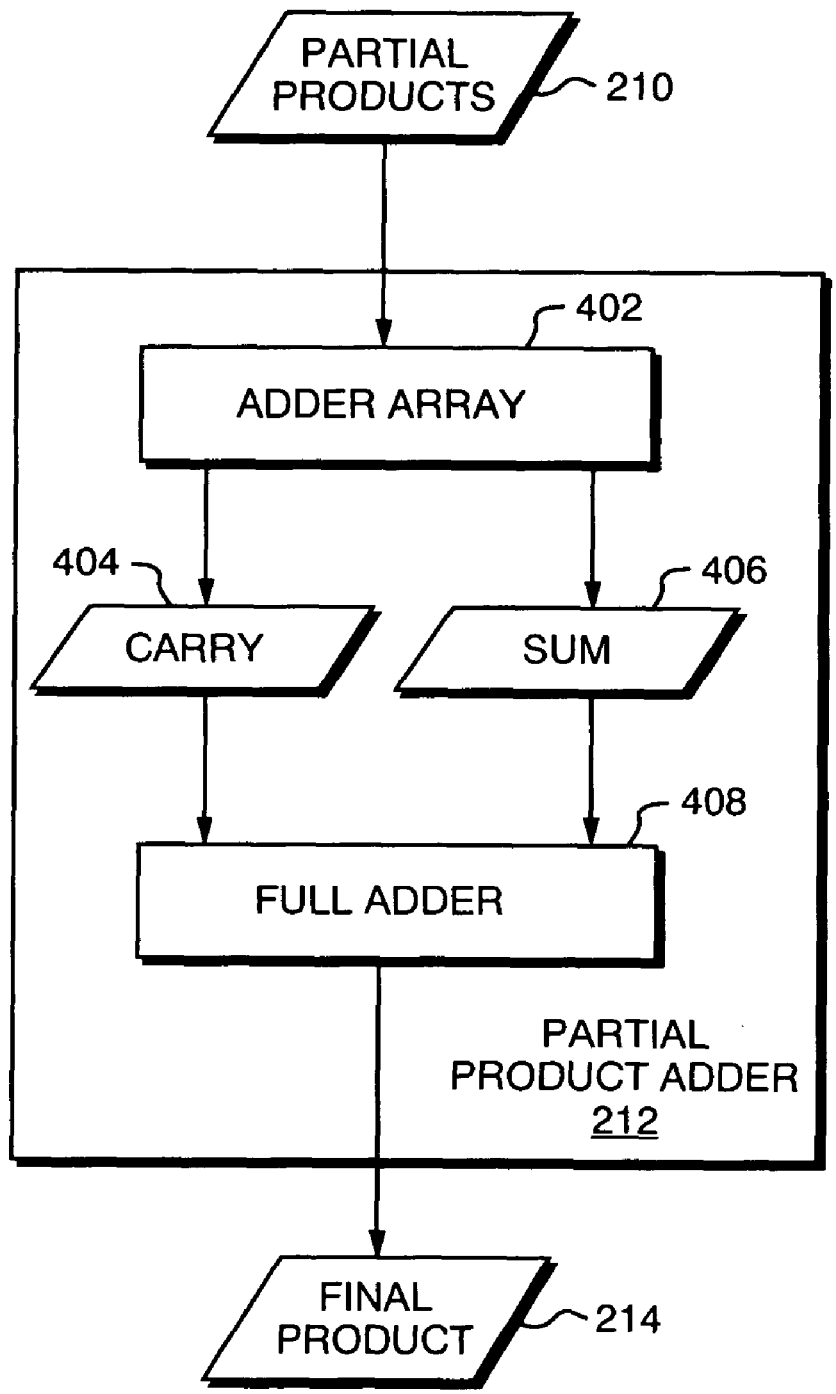
FIG. 4 is a functional block diagram of a prior art system for adding a plurality of partial products produced when multiplying two binary numbers.
Figure 5A:
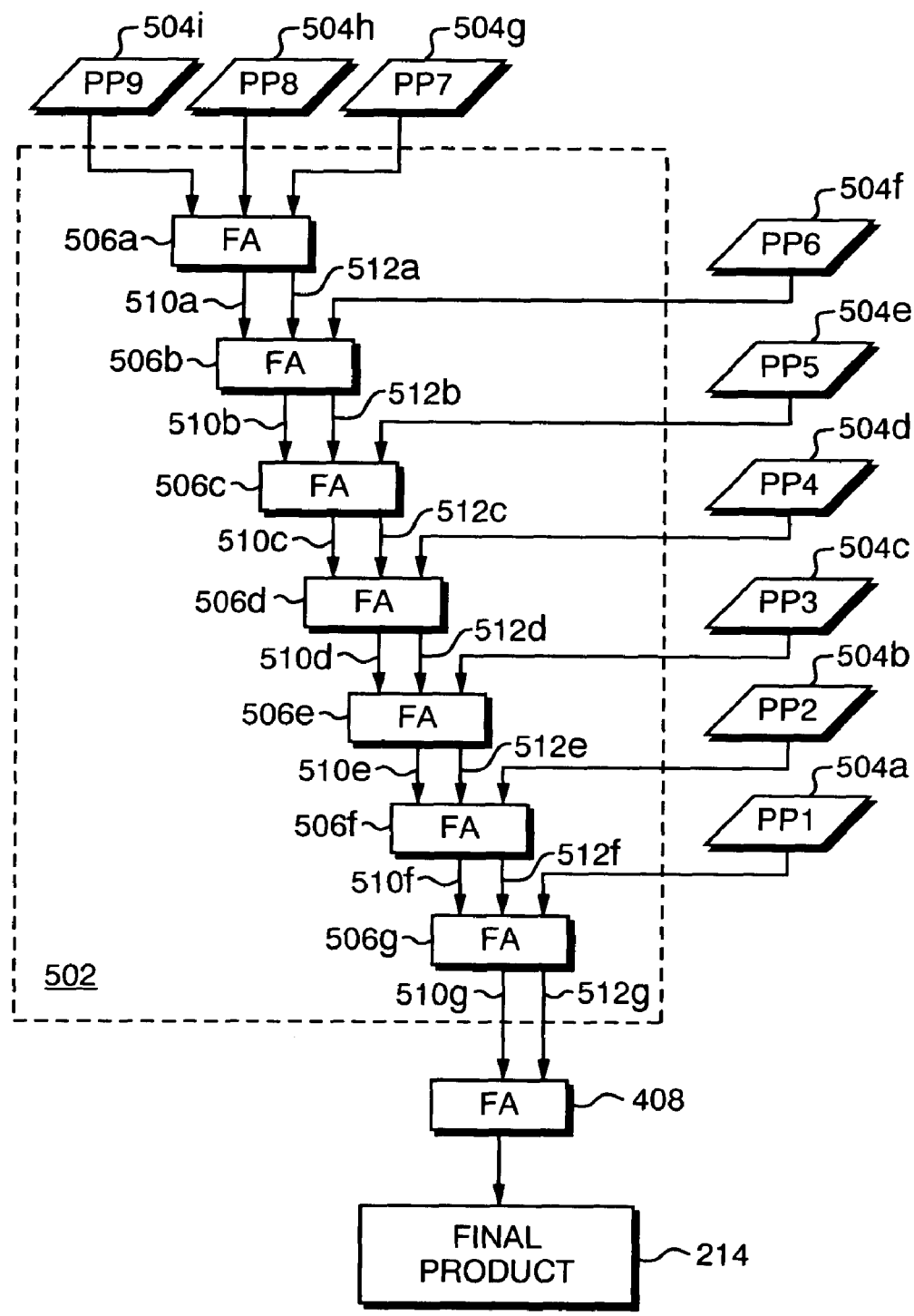
FIG. 5A is a functional block diagram of a prior art linear adder array for use in a multiplier circuit.
Figure 5B:
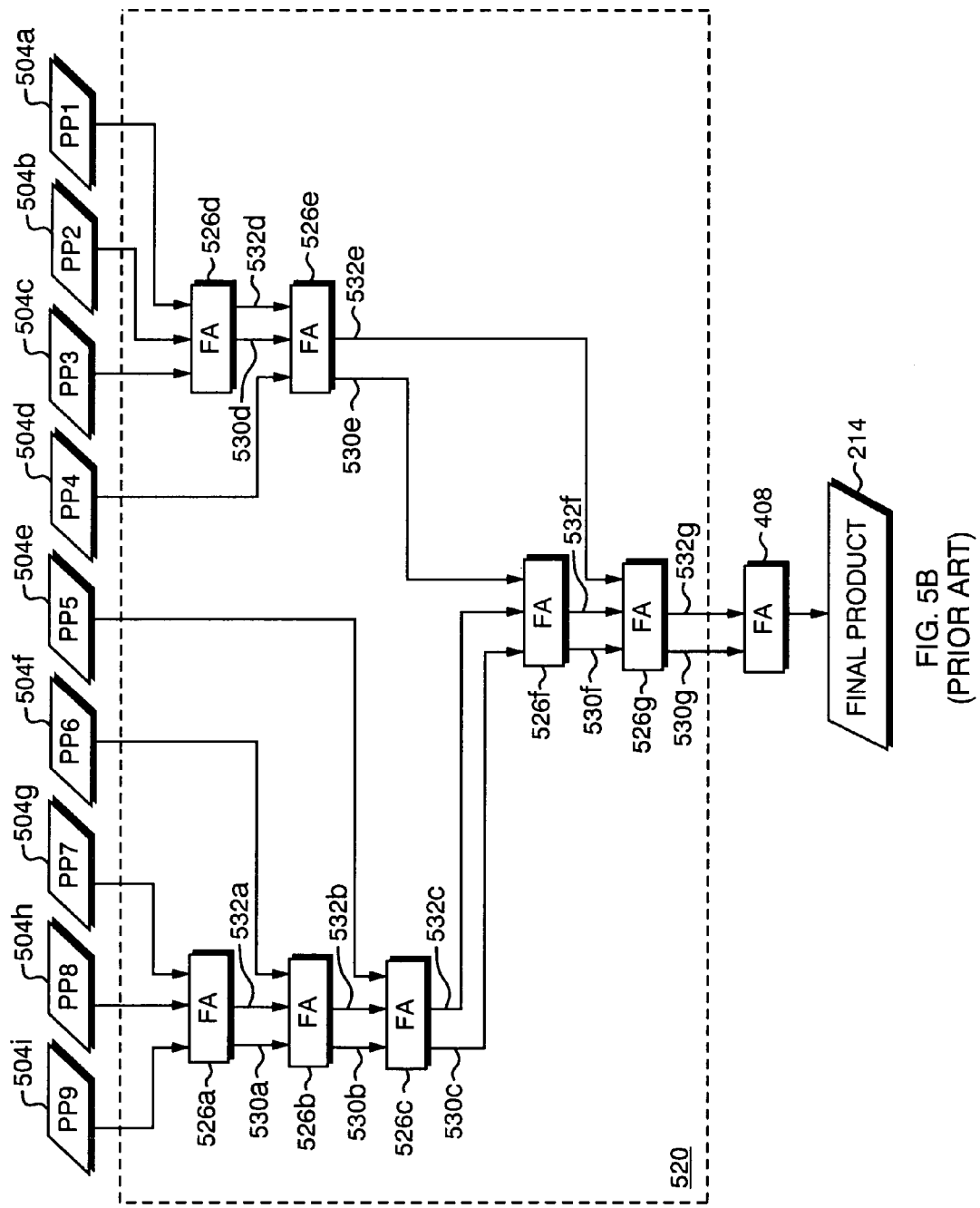
FIG. 5B is a functional block diagram of a prior art parallel adder array for use in a multiplier circuit.
Figure 5C:
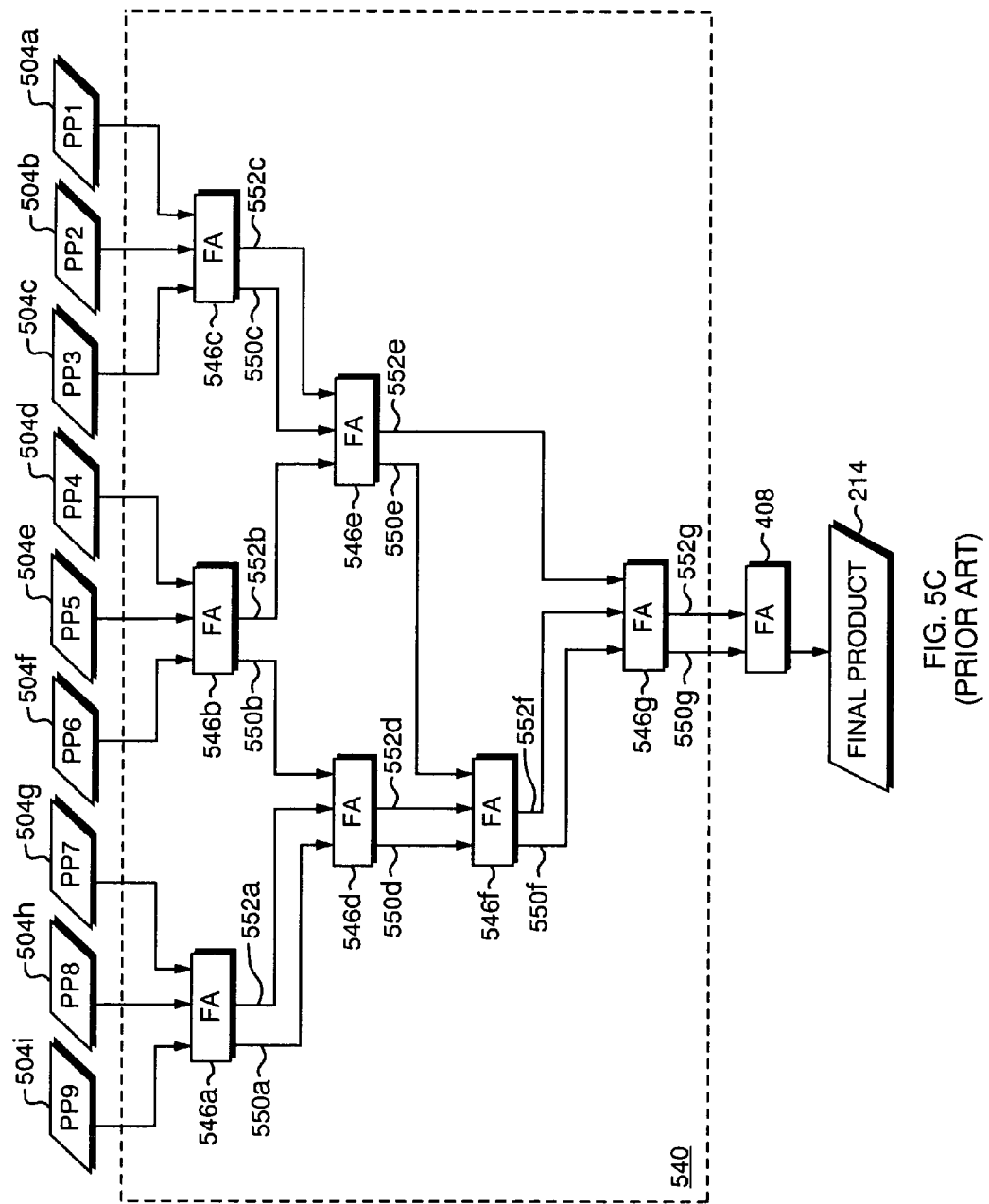
FIG. 5C is a functional block diagram of a prior art Wallace tree adder array for use in a multiplier circuit.

Sum word 606*g* may be combined with bits 610*e* to form a complete 96-bit sum word (such as sum word 406 shown in FIG. 4), and carry word 606*h* may be combined with bits 610*f* to form a complete carry word (such as carry word 404) that may be provided to the full adder 408 to produce the final product 214.

Note that in the system 600 illustrated in FIG. 6, compressors in different rows may have widths that differ substantially from each other. For example, although the compressors 604*a–d* in row 626*a* are 71 bits wide, the compressors 604*e–f* in row 626*b* are 72 bits wide, and the compressor 604*g* in row 626*c* is 80 bits wide. If bits 610*a–f* were not stripped from their respective words to bypass the compressors 604*e–g*, the compressors in each of the rows 626*a–c* would have different widths. Such a property makes it difficult to lay out circuitry that implements the system 600 because it is not possible to run wires in a regular manner from one row to the next. As a result, a significant amount of manual effort typically is required to lay out a circuit that implements a system such as system 600.

Figure 8:
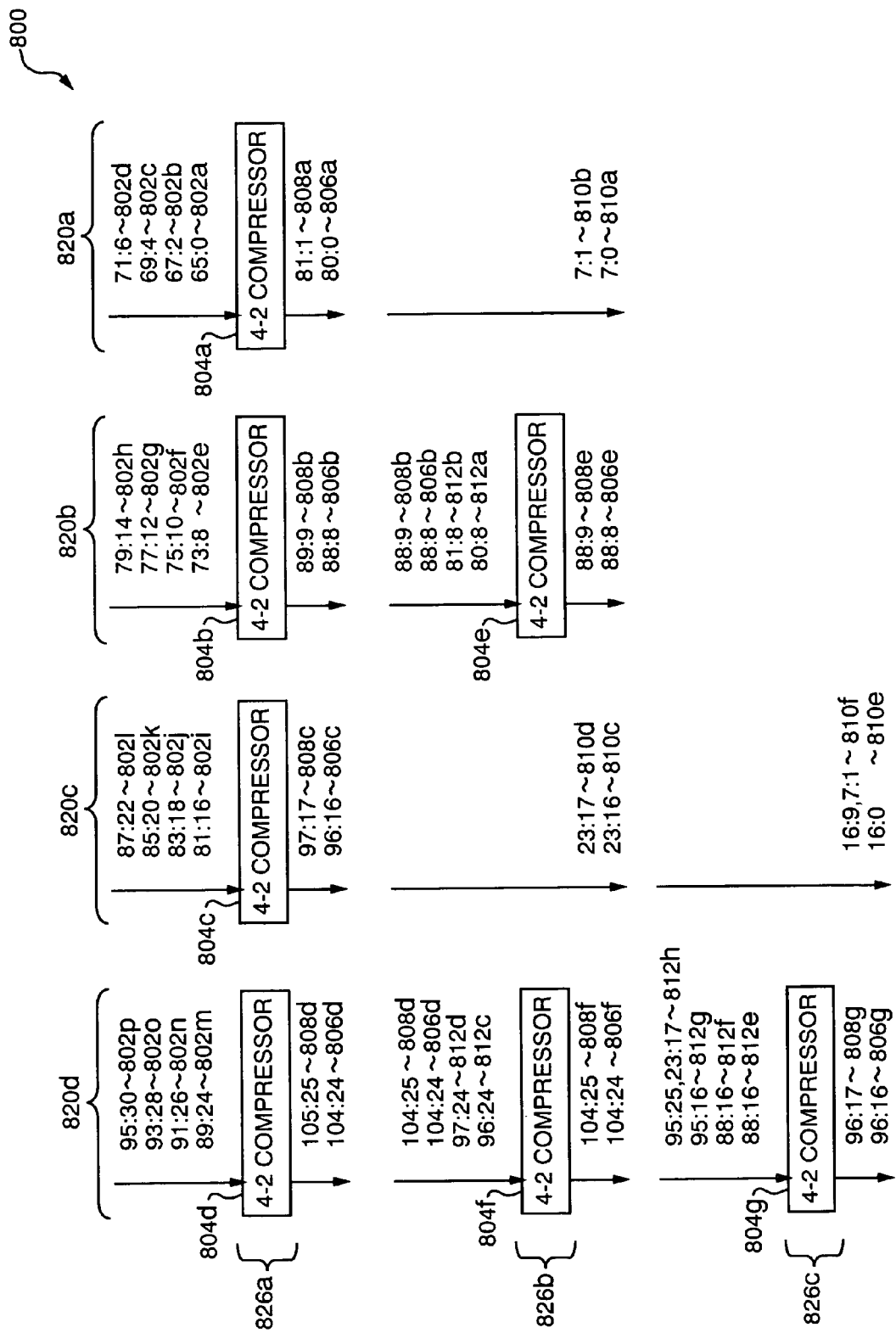
FIG. 8 is a diagram of a system for summing sixteen partial products according to one embodiment of the present invention.

Referring to FIG. 8, a diagram is shown of a system 800 that sums 16 partial products 802*a–p* according to one embodiment of the present invention. In the example illustrated in FIG. 8, each of the partial products 802*a–p* is 66 bits wide.

The system 800 includes compressors 804*a–g*, distributed among three rows 826*a–c*. In particular, row 826*a* includes compressors 804*a–d*, row 826*b* includes compressors 804*e–f*, and row 826*c* includes compressor 804*g*. In the embodiment illustrated in FIG. 800, each of the compressors 804*a–g* has the same width. In particular, each of the compressors 804*a–g* is 81 bits wide.

As in FIG. 6, the partial products 802*a–p* in FIG. 8 are divided into four groups containing partial products 802*a–d*, 802*e–h*, 802*i–l*, and 802*m–p*, which are provided as inputs to compressors 804*a–d*, respectively. Inputs to the compressors 804*a–g* may be padded in the manner described above with respect to FIG. 6.

The system 800 is divided into four columns 820*a–d*. The partial products 802*a–p* are divided into four groups containing partial products 802*a–d*, 802*e–h*, 802*i–l*, and 802*m–p*, which are provided as inputs to compressors 804*a–d*, respectively. Compressors 804*a–d* and their respective inputs are distributed among the four columns 820*a–d*.

The compressors 804*a–d* sum their inputs and produce corresponding sum words 806*a–d* and carry words 808*a–d* as output. Note that all of the words 806*a–d* and 808*a–d* output by compressors 804*a–d* are 81 bits wide. Any extra bits (i.e., bits 81:72 in words 806*a* and 808*a*, and bits 104:96 in words 806*d* and 808*d*) in words output by the compressors 804*a–g* are guaranteed to be zero and, thus, may or may not be consumed in the following compressor rows.

Referring now to row 826*b*, certain bits 810*a–d* of words 806*a*, 808*a*, 806*c*, and 808*c* are passed through row 826*b* without being input to the compressors 804*e–f* in row 826*b* for the reasons explained above with respect to FIG. 6.

The inputs to compressor 804*e* are words 806*b* and 808*b* (produced by compressor 804*b* in row 826*a*) and words 812*a* and 812*b*, which are produced by stripping least significant bits 810*a* and 810*b* from words 806*a* and 808*a*, respectively. Similarly, the inputs to compressor 804*f* are words 806*d* and 808*d* (produced by compressor 804*d* in row 826*a*) and words 812*c* and 812*d*, which are produced by stripping least significant bits 810*c* and 810*d* from words 806*c* and 808*c*, respectively.

The compressors 804*e–f* sum their inputs and produce as outputs corresponding sum words 806*e–f* and carry words 808*e–f*. In this way, the compressors 804*e–f* reduce their eight inputs (i.e., words 812*a–d*, 806*b*, 806*d*, 808*b*, and 808*d*) into four words 806*e–f* and 808*e–f*. The high bits of carry words 808*e–f* are stripped for the reasons described above with respect to FIG. 6.

Referring now to row 826*c*, word 812*h* is formed by stripping bits 104:96 from word 808*f* and combining the remaining bits (95:25) with word 810*d*. Word 812*g* is formed by stripping bits 104:96 from word 806*f* and combining the remaining bits (95:24) with bits 810*c*. Word 812*f* is formed by stripping bits 16:9 from word 808*e*. Bits 16:9 that are stripped from word 808*e* are combined with bits 810*b* to form bits 810*f*. Bits 16:8 are stripped from word 806*e* to form word 812*e*. Bits 810*a* are combined with bits 16:8 from word 806*e* to form bits 810*e*.

Words 812*h*, 812*g*, 812*f*, and 812*e* are provided as inputs to compressor 804*g* in row 826*c*. The compressor 804*g* sums its inputs and produces a corresponding sum word 806*g* and carry word 806*h* as output. In this way, compressor 804*g* reduces its four inputs (i.e., words 812*e–h*) into two words 806*g* and 806*h*.

Sum word 806*g* may be combined with bits 810*e* to form a complete 96-bit sum word (such as sum word 406 shown in FIG. 4), and carry word 806*g* may be combined with bits 610*g* to form a complete carry word (such as carry word 404) that may be provided to the full adder 408 to produce the final product 214.

One advantage of the scheme illustrated in FIG. 8 is that all of the compressors 804*a–g* have the same width (i.e., 81 bits). This enables circuitry that implements the system 800 to be laid out using routing that has a regular pattern. More specifically, a system such as the system 800 typically is laid out in a plurality of physical columns, each of which carries a signal for a single bit position in the numbers added by the system 800. Such physical columns are not to be confused with the logical columns 820*a–d* shown in FIG. 8 and the other drawings herein. The bit at position 8 in each of words 802*a*, 802*b*, 802*c*, 802*d*, 802*e*, 812*a*, and 812*b*, for example, may be routed through a single physical column. The equal width of the compressors 804*a–g* in the system 800 enables the layout of such a physical column to be replicated, either exactly or with relatively small changes, for use as the layout of other physical columns. In this way, the fact that the compressors 804*a–g* have the same width produces a regularity in the system 800 that may enable the system 800 to be laid out with significantly less effort, and in significantly less time, than a system with variable-width compressors.

Figure 9:
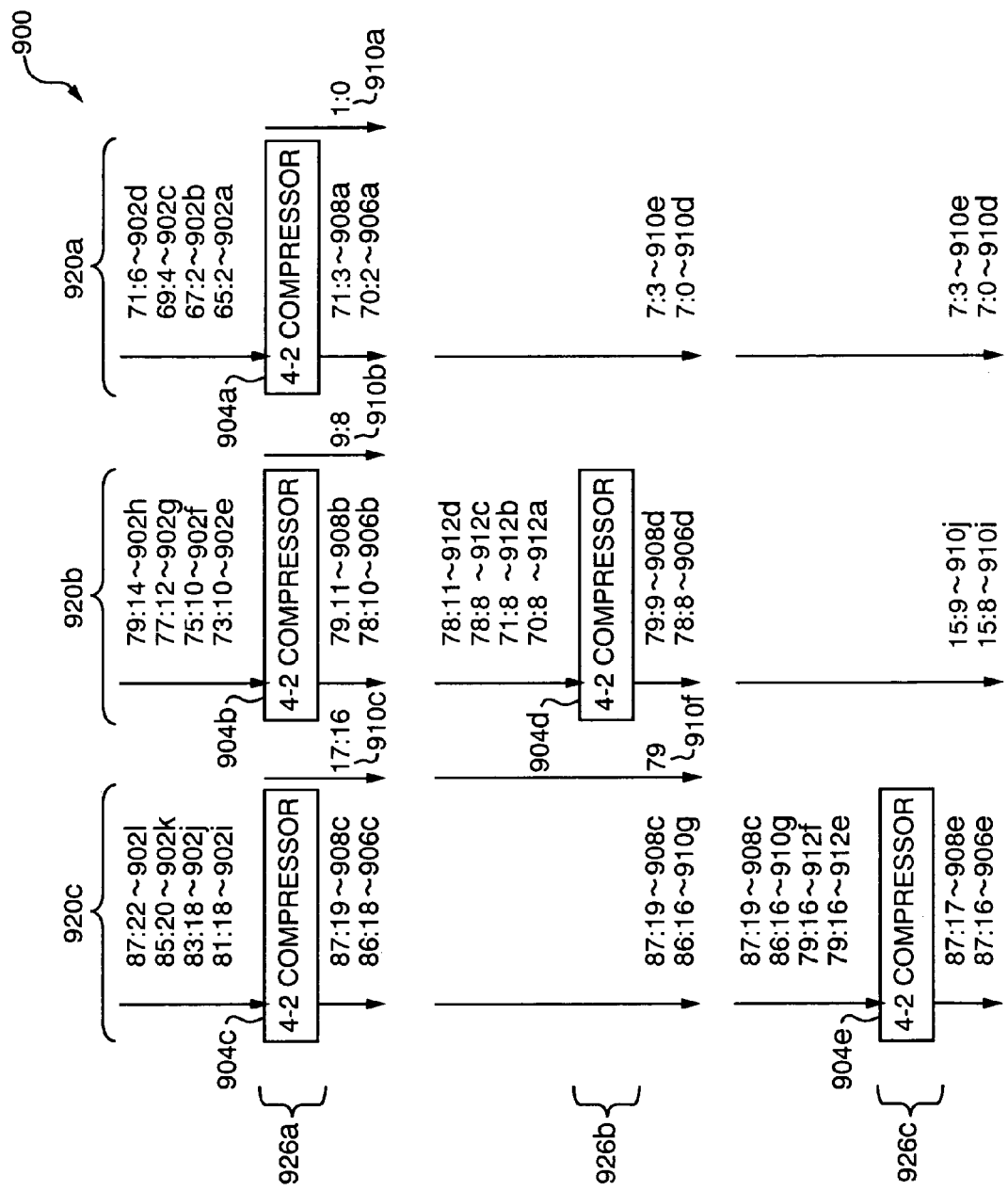
FIG. 9 is a diagram of a system for summing twelve partial products according to one embodiment of the present invention.

Referring to FIG. 9, a diagram is shown of a system 900 that sums 12 partial products 902*a–l* according to one embodiment of the present invention. In the example illustrated in FIG. 9, each of the partial products 902*a–l* is 66 bits wide, with some exceptions described in more detail below. Although word 902*l* is referred to as a partial product in the following discussion, word 902*l* may either be a partial product or a sign extension correction constant formed by performing sign extension on the partial products 902*a–k* using techniques well-known to those of ordinary skill in the art.

The system 900 includes compressors 904*a–e*, distributed among three rows 926*a–c*. In particular, row 926*a* includes compressors 904*a–c*, row 926*b* includes compressor 904*d*, and row 926c includes compressor 904e. In the embodiment illustrated in FIG. 900, each of the compressors 904a–e has substantially the same. In particular, each of the compressors 904a–c are 69 bits wide, compressor 904d is 71 bits wide, and compressor 904e is 72 bits wide.

The system 900 is divided into three columns 920a–c. The partial products 902a–l are divided into three groups containing partial products 902a–d, 902e–h, and 902i–l, which are provided as inputs to compressors 904a–c, respectively. Compressors 904a–c and their respective inputs are distributed among the three columns 920a–c. Bits 910a from partial product 902a are passed through row 926a rather than input to the compressor 904a. Similarly, bits 910b of partial product 902e and bits 910c of partial product 902i are passed through row 926a. These bits 910a–c may be passed through row 926a for the reasons described previously.

The compressors 904a–c sum their inputs and produce corresponding sum words 906a–c and carry words 908a–c as outputs. Note that all of the words 906a–c and 908a–c output by compressors 904a–c are 69 bits wide. Unlike the compressors 804a–g in the system 800 shown in FIG. 8, the compressors 904a–e in the system 900 shown in FIG. 9 do not pad the most significant bits of their outputs with zeros. Rather, the compressors 904a–e are just wide enough to produce exactly the number of output bits necessary.

Referring now to row 926b of system 900, word 910g is formed by combining word 906c and word 910c. Words 910g and 908c are passed through row 926b. Bits 7:2 are stripped from word 906a and combined with bits 910a to form bits 910d and word 912a. Bits 7:3 are stripped from word 908a to form bits 910e and word 912b. Word 912c is formed by combining word 906b with bits 910b. Word 912d is formed by stripping the most significant bit 910f from carry word 908b.

Bits 910d–f are passed through row 926b. Words 912a–d are provided as inputs to compressor 904d. Compressor 904d sums its inputs to produce sum word 906d and carry word 906d. In this way, compressor 906d reduces its four inputs (i.e., words 912a–d) into two words 906d and 908d.

Referring now to row 926c of system 900, words 910g and 908c from row 926b are provided as inputs to compressor 904e. Bits 15:8 are stripped from word 906d, thereby forming bits 910i, and bits 15:9 are stripped from word 908d, thereby forming bits 910j.

Word 912e is formed from the remaining bits 79:16 of word 906d, and word 912f is formed by combining the remaining bits 79:16 of word 908d with bit 910f. Word 912f is formed from the remaining bits of word 908d. Words 912e–f and 910g–h are provided as inputs to compressor 904e. Compressor 904e sums its inputs to produce sum word 906e and carry word 908e.

Sum word 906e may be combined with bits 910i and 910d to form a complete 88-bit sum word (such as sum word 406 shown in FIG. 4), and carry word 908e may be combined with bits 910j and 910e to form a complete carry word (such as carry word 404) that may be provided to the full adder 408 to produce the final product 214.

One advantage of the scheme illustrated in FIG. 9 is that each of the rows 926a–c contains nearly the same number of physical columns, thereby enabling the layout from one physical column to be copied to another physical column or used as a starting point for laying out another physical column. Furthermore, circuitry implementing the system 900 will tend to have fewer route-overs in layout than circuitry implementing systems (such as the system 800 shown in FIG. 8) that use extra compressor bits.

Figure 10:
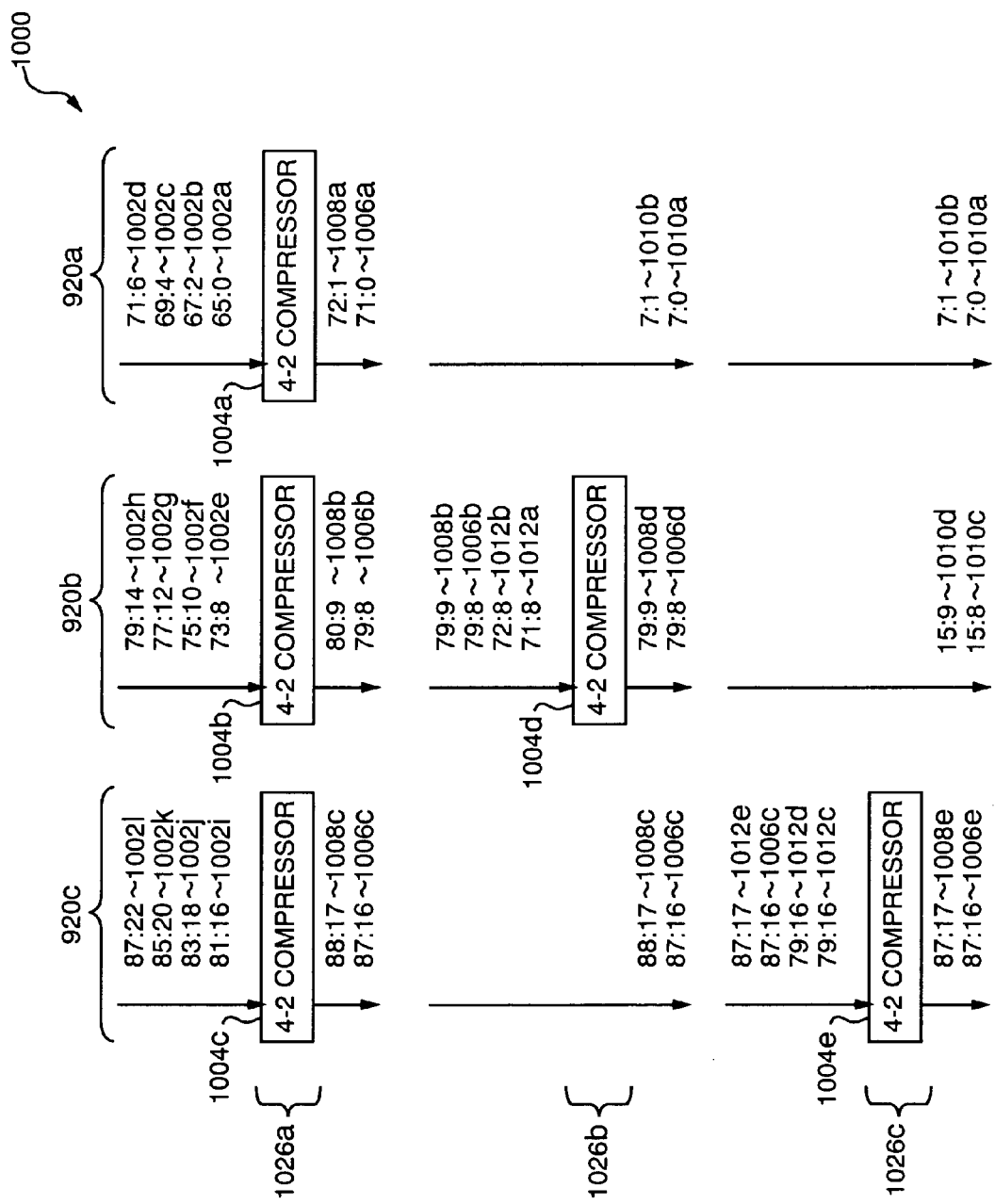
FIG. 10 is a diagram of a system for summing twelve partial products according to another embodiment of the present invention.

Referring to FIG. 10, a diagram is shown of a system 1000 that sums 12 partial products 1002a–l according to one embodiment of the present invention. In the example illustrated in FIG. 10, each of the partial products 1002a–l is 66 bits wide.

The system 1000 may, for example, be part of a larger system (such as that shown in FIG. 11) for multiplying two 66-bit numbers. Such a system may produce a total of 66 partial products, which may be reduced to 33 partial products using Booth encoding. This set of 33 partial products may be divided into three sets of 11 partial products, each of which may be processed using a system such as that shown in FIG. 10. For example, the partial products 1002a–k may be one such set of 11 partial products. The twelfth word 1002l may be a sign bit extension correction value that is formed in the manner described above with respect to FIG. 9.

The system 1000 includes compressors 1004a–e, distributed among three rows 1026a–c. In particular, row 1026a includes compressors 1004a–c, row 1026b includes compressor 1004d, and row 1026c includes compressor 1004e. In the embodiment illustrated in FIG. 1000, each of the compressors 1004a–e has the same width. In particular, each of the compressors 1004a–e is 72 bits wide. Note that this differs from the system 900 shown in FIG. 9, in which the compressors 904a–e are substantially, but not exactly, the same width as each other.

The system 1000 is divided into three columns 1020a–c. The partial products 1002a–l are divided into three groups containing partial products 1002a–d, 1002e–h, and 1002i–l, which are provided as inputs to compressors 1004a–c, respectively. Compressors 1004a–c and their respective inputs are distributed among the three columns 1020a–c.

The compressors 1004a–c sum their inputs and produce corresponding sum words 1006a–c and carry words 1008a–c as outputs. Note that all of the words 1006a–c and 1008a–c output by compressors 1004a–c are 72 bits wide. By using 72-bit compressors 1004a–c, the system 1000 is able to retain all bits in the words 906a–c and 908a–c.

Referring now to row 1026b of system 1000, words 1006c and 1008c (produced by compressor 1004c in row 1026a) are passed through row 1026b. Bits 7:1 are stripped from word 1008a to produce bits 1010b, and bits 7:0 are stripped from word 1006a to produce bits 1010a. Bits 1010a and 1010b are passed through row 1026b. Word 1012a is formed from the remaining bits 70:8 of word 1006a, and word 1012b is formed from the remaining bits 71:8 of word 1008b. Words 1008b, 1006b, 1012b, and 1012a are provided as inputs to compressor 1004d. Compressor 1004d sums its inputs to produce sum word 1006d and carry word 1006d. In this way, compressor 1004d reduces its four inputs (i.e., words 1012a–b, 1006b, and 1008b) into two words 1006d and 1008d.

Referring now to row 1026c of system 1000, word 1012e is formed by stripping the most significant bit from word 1008c in row 1026b. Word 1006c is passed through from row 1026b to row 1026c. Bits 15:8 are stripped from word 1006d, thereby forming bits 1010c, and bits 15:10 are stripped from word 1008d, thereby forming bits 1010d. Word 1012c is formed from the remaining bits 79:16 of word 1006d, and word 1012d is formed from the remaining bits 79:16 of word 1008d. Words 1008c, 1006c, 1012d, and 1012c are provided as inputs to compressor 1004e. Compressor 1004e sums its inputs to produce sum word 1006e and carry word 1008e.

Sum word 1006e may be combined with bits 1010c and 1010a to form a complete 88-bit sum word (such as sum word 406 shown in FIG. 4), and carry word 1008e may be combined with bits 1010d and 1010b to form a complete carry word (such as carry word 404) that may be provided to the full adder 408 to produce the final product 214.

One advantage of the system 1000 illustrated in FIG. 10 is that each of the columns 1020a–c is the same width (i.e., contains the same number of bits), thereby enabling the layout from one physical column to be copied to another physical column or used as a starting point for laying out another physical column. Furthermore, circuitry implementing the system 1000 will tend to have fewer route-overs in layout than circuitry implementing systems (such as the system 800 shown in FIG. 8) that use extra compressor bits.

Figure 11:
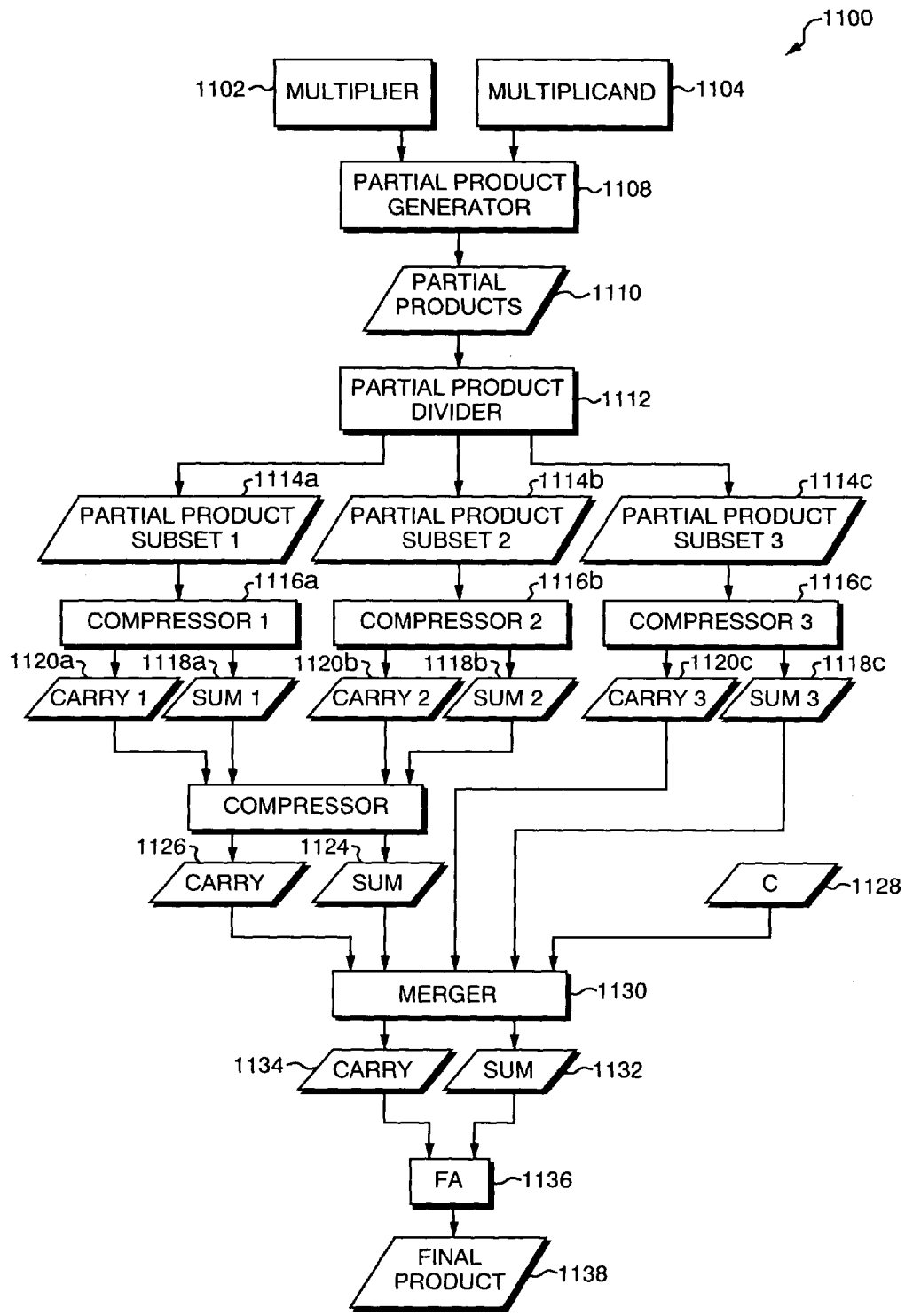
FIG. 11 is a dataflow diagram of a system for multiplying a multiplicand by a multiplier according to one embodiment of the present invention.

As mentioned above, the partial products 1002a–k that are input to system 1000 may constitute one of three sets of partial products. The outputs of three systems employing the techniques illustrated in FIG. 10 may be combined (e.g., added) to produce a final product of the original multiplicand and multiplier. Referring to FIG. 11, a diagram is shown of a system 1100 that performs an entire multiplication operation in this manner.

As previously described with respect to FIG. 2, a multiplier 1102 and multiplicand 1104 are provided as inputs to a partial product generator 1108. The multiplier 1102 and multiplicand 1104 may, for example, be 66-bit numbers that result from encoding 64-bit numbers using 2's complement representation and Booth encoding. The partial product generator 1108 produces a set of 66 partial products 1110. The set of partial products 1110 is provided to a partial product divider 1112, which divides the set of partial products 1110 into three sets 1114a–c of partial products. Each of the sets 1114a–c includes 11 partial products. Sign bit extension values may be added to each of the sets 1114a–c, in which case each of the sets 1114a–c may include 12 values.

The system 1100 includes three compressor subcomponents 1116a–c, each of which may, for example, be implemented using the structure illustrated in FIG. 10. Each of the compressor components 1116a–c receives one of the sets 1114a–c of partial products as input and produces a sum word and carry word as output, as described above with respect to FIG. 10.

More specifically, the first partial product set 1114a is provided as an input to compressor subcomponent 1116a, which compresses the partial products in set 1114a (e.g., using the techniques described above with respect to FIG. 10) to produce a sum word 1118a and a carry word 1120a.

The second partial product set 1114b is provided as an input to compressor subcomponent 1116b, which compresses the partial products in set 1114b (e.g., using the techniques described above with respect to FIG. 10) to produce a sum word 1118b and carry word 1120b. The outputs 1118a–b and 1120a–b of compressor subcomponents 1116a–b are provided as input to a 4-2 compressor 1122 that adds the words 1118a–b and 1120a–b to produce a sum word 1124 and carry word 1126 as output.

The third partial product set 1114c is provided as an input to compressor subcomponent 1116c, which compresses the partial products in set 1114c (e.g., using the techniques described above with respect to FIG. 10) to produce a sum word 1118c and carry word 1120c.

Finally, the outputs of the 4-2 compressor 1122 (i.e., words 1124 and 1126) and the outputs of the third compressor subcomponent 1116c (i.e., words 1118c and 1120c) are provided as inputs to a merger component 1130. The system 1100 illustrated in FIG. 11 performs a "multiply accumulate" operation in which the product of the multiplier 1102 and the multiplicand 1104 are added to a third value referred to as an addend 1128. The addend 1128 is also provided as an input to the merger component 1130. Multiply accumulate operations are well-known to those of ordinary skill in the art. The use of multiply accumulate operations is provided merely as an example and does not constitute a limitation of the present invention.

The merger component 1130 may, for example, include a carry save adder that adds its inputs (i.e., words 1124, 1126, 1118c, 1120c, and 1128) to produce a 132-bit sum word 1132 and a 132-bit carry word 1134. The sum word 1132 and carry word 1134 are provided to a full adder 1136 that adds the sum word 1132 to the carry word 1134 to produce a final product 1138 that is equal to the sum of the product of the multiplicand 1104 and the multiplier 1102 and the addend 1128.

Embodiments of the present invention have various advantages, including but not limited to the following.

As mentioned above, the structure of a Wallace tree adder array is complex. As a result, typically it is difficult to lay out schematics for circuitry implementing a Wallace tree quickly, easily, and efficiently. As a result of the Wallace tree's complex structure, circuits implementing Wallace trees tend to include long wiring paths. The signal propagation delays incurred on such paths can be significant enough to significantly mitigate or even negate the theoretical speed benefits of Wallace trees.

In contrast, various embodiments of the present invention, such as the systems shown in FIGS. 8–10, employ the general structure of the Wallace tree while enabling such a structure to be laid out in a more regular manner. In particular, the systems illustrated in FIGS. 8–10 employ compressor rows having the same or substantially the same widths, thereby enabling such systems to be implemented in circuitry having rows of the same or substantially the same widths. As a result, such systems may be laid out more quickly than systems implementing the conventional Wallace tree structure.

By retaining the general structure of the Wallace tree however, systems such as those illustrated in FIGS. 8–10 substantially retain the performance advantages of the Wallace tree. As mentioned above, the calculation time of the Wallace tree is in theory proportional to the logarithm of the number of bits in the multiplier. Systems such as those illustrated in FIGS. 8–10 may have calculation times that approach this theoretical value while avoiding the layout irregularities typically associated with Wallace trees.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Figure 7:
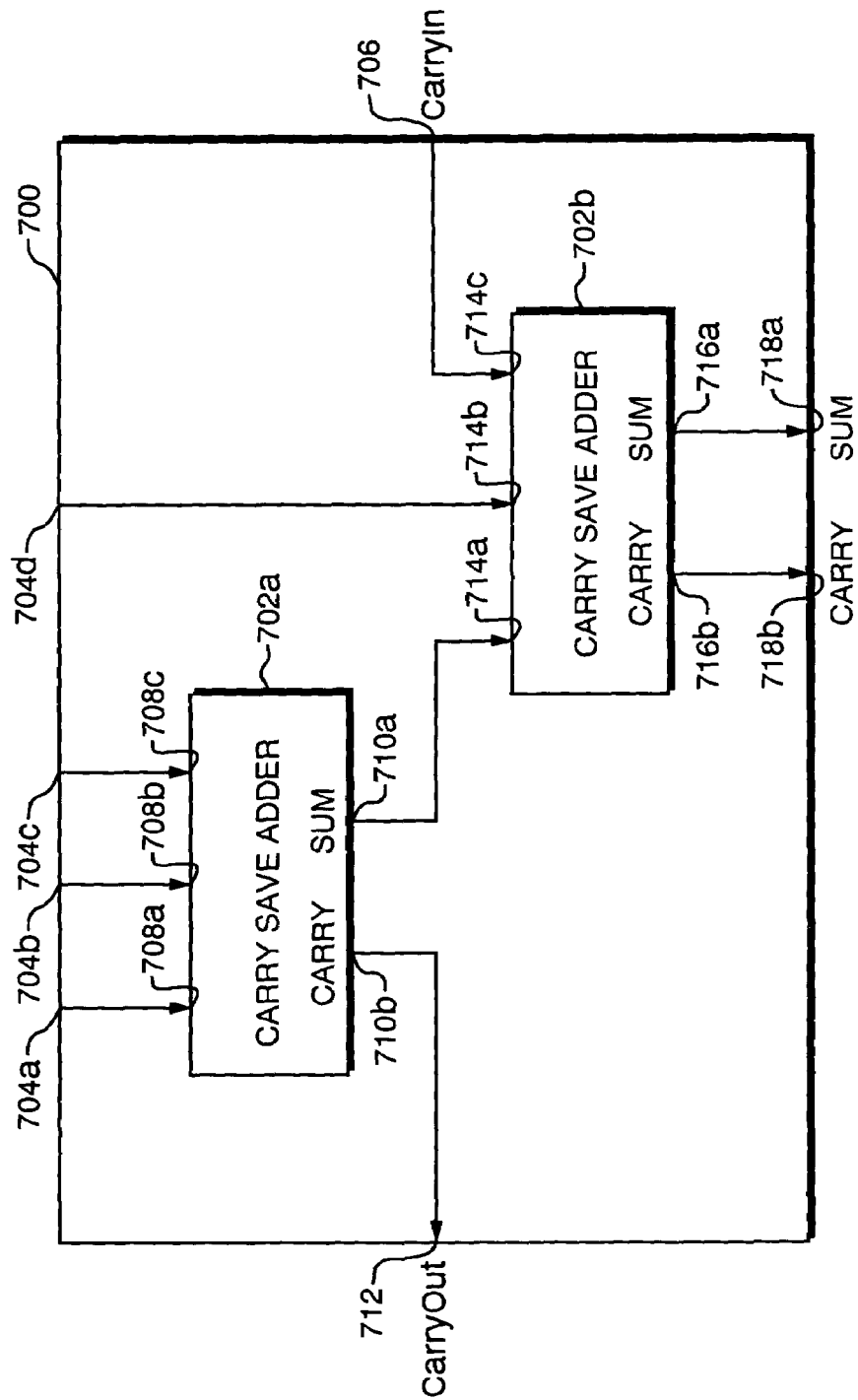
FIG. 7 is a block diagram of a 4-2 compressor.

Although various embodiments of the invention disclosed herein employ 4:2 compressors, this is merely an example and does not constitute a limitation of the present invention. Embodiments of the present invention may employ other kinds of compressors. Furthermore, it should be appreciated that the compressor 700 shown in FIG. 7 is merely one example of a compressor that may be used in conjunction with embodiments of the present invention. In addition, the particular arrangement and widths of the compressors shown in FIGS. 6, 8, 9, and 10 are shown merely for purposes of example and do not constitute limitations of the present invention. Rather, those having ordinary skill in the art will appreciate how to use compressors having other widths and arranged in other arrangements to implement embodiments of the present invention.

Although partial products and other binary values in the examples provided above are described as being encoded using Booth encoding, this is not a limitation of the present invention. Similarly, although partial products and other binary values in the examples provided above are described as being represented in 2's complement representation, this is not a limitation of the present invention. Rather, the present invention may be used in conjunction with numbers encoded and/or represented in any manner. Furthermore, although examples provided above employ the technique of sign bit extension, this is not a requirement of the present invention.

Although embodiments of the present invention are described in conjunction with multiplication of 64-bit numbers, this is not a requirement of the present invention. Rather, the techniques disclosed herein may be used in conjunction with the multiplication of numbers having greater or fewer than 64 bits.

What is claimed is:

1. A circuit comprising:
   a partial product generator comprising:
     a first input to receive a multiplicand;
     a second input to receive a multiplier;
     partial product generation means for producing a plurality of partial products based on the multiplicand and the multiplier; and
     an output coupled to the partial product generation means to provide the plurality of partial products; and
   a partial product adder comprising:
     an input coupled to the output of the partial product generator;
     a plurality of adders to add the plurality of partial products to produce a final product, the plurality of adders comprising a plurality of compressors interconnected in a Wallace tree configuration and having the same width; and
     an output coupled to the plurality of adders to provide the final product.

2. The circuit of claim 1, wherein the plurality of adders comprises:
   an adder array comprising a subset of the plurality of adders, a first output to produce a sum signal, and a second output to produce a carry signal, the subset of the plurality of adders comprising a plurality of carry save adders to sum the plurality of partial products to produce the sum signal and the carry signal; and
   a full adder comprising a first input coupled to the first output of the adder array, a second input coupled to the second output of the adder array, means for adding the sum signal to the carry signal to produce the final product, and an output to provide the final product.

3. The circuit of claim 1, wherein the multiplier is at least 64 bits wide.

4. The circuit of claim 1, wherein the multiplicand is at least 64 bits wide.

5. The circuit of claim 1, wherein the width of each compressor C in the plurality of compressors is equal to the sum of the widths of the inputs of compressor C.

6. The circuit of claim 1, wherein each of the plurality of partial products is at least 64 bits wide.

7. The circuit of claim 1, wherein the plurality of compressors comprises a plurality of 4-2 compressors.

8. A circuit comprising:
   a partial product generator comprising:
     a first input to receive a multiplicand that is at least 64 bits wide, a second input to receive a multiplier that is at least 64 bits wide;
     partial product generation means for producing a plurality of partial products based on the multiplicand and the multiplier; and
     an output coupled to the partial product generation means to provide the plurality of partial products; and
   a partial product adder comprising:
     an input coupled to the output of the partial product generator;
     a plurality of adders to add the plurality of partial products to produce a final product, the plurality of adders comprising a plurality of 4-2 compressors interconnected in a Wallace tree configuration and having the same width; and
     an output coupled to the plurality of adders to provide the final product.

9. A circuit comprising:
   a plurality of compressors interconnected in a Wallace tree configuration and having a plurality of inputs and a plurality of outputs;
   a first compressor row comprising a first subset of the plurality of compressors, the inputs of the first subset of the plurality of compressors being wired in parallel to receive a plurality of distinct inputs;
   a second compressor row comprising a second subset of the plurality of compressors, outputs of the first subset of the plurality of compressors being coupled to inputs of the second subset of the plurality of compressors;
   wherein all of the compressors in the plurality of compressors have substantially the same width.

10. The circuit of claim 9, wherein the width of any compressor C in the plurality of compressors does not differ from the width of any other one of the plurality of compressors by more than one bit.

11. The circuit of claim 9, wherein the width of any compressor C in the plurality of compressors does not differ from the width of any other one of the plurality of compressors by more than two bits.

12. The circuit of claim 9, further comprising:
    a third compressor row comprising a third subset of the plurality of compressors, outputs of the second subset of the plurality of compressors being coupled to inputs of the third subset of the plurality of compressors.

13. The circuit of claim 12, wherein the first compressor row comprises a first compressor, a second compressor, and a third compressor, wherein the second compressor row comprises a fourth compressor, and wherein the third compressor row comprises a fifth compressor.

14. The circuit of claim 12, wherein each of the plurality of compressors is 72 bits wide.

15. The circuit of claim 9, wherein the width of each compressor C in the plurality of compressors is equal to the sum of the widths of the inputs of compressor C.

16. The circuit of claim 9, wherein each of the inputs of each of the plurality of compressors is at least 64 bits wide.

17. The circuit of claim 9, wherein the first compressor row comprises a first compressor, a second compressor, and a third compressor, and wherein the second compressor row comprises a fourth compressor.

18. The circuit of claim 9, wherein the plurality of compressors comprises a plurality of 4-2 compressors.

19. The circuit of claim 9, wherein the plurality of compressors comprises a plurality of carry save adders.

20. A circuit comprising:
a plurality of 72-bit wide 4-2 compressors having a plurality of inputs and a plurality of outputs, the plurality of compressors comprising a plurality of carry save adders, each of the plurality of inputs and the plurality of outputs being at least 64 bits wide;
a first compressor row comprising a first subset of the plurality of compressors, the inputs of the first subset of the plurality of compressors being wired in parallel to receive a plurality of distinct inputs;
a second compressor row comprising a second subset of the plurality of compressors, outputs of the first subset of the plurality of compressors being coupled to inputs of the second subset of the plurality of compressors; and
a third compressor row comprising a third subset of the plurality of compressors, outputs of the second subset of the plurality of compressors being coupled to inputs of the third subset of the plurality of compressors;
wherein the width of any compressor C in the plurality of compressors does not differ from the width of any other one of the plurality of compressors by more than three bits.

21. A circuit comprising:
a plurality of compressors interconnected in a Wallace tree configuration and having a plurality of inputs and a plurality of outputs;
a first compressor row comprising a first subset of the plurality of compressors, the inputs of the first subset of the plurality of compressors being wired in parallel to receive a plurality of distinct inputs;
a second compressor row comprising a second subset of the plurality of compressors, outputs of the first subset of the plurality of compressors being coupled to inputs of the second subset of the plurality of compressors;
wherein all of the compressors in the plurality of compressors have the same width.

22. The circuit of claim 21, further comprising:
a third compressor row comprising a third subset of the plurality of compressors, outputs of the second subset of the plurality of compressors being coupled to inputs of the third subset of the plurality of compressors.

23. The circuit of claim 22, wherein the first compressor row comprises a first compressor, a second compressor, and a third compressor, wherein the second compressor row comprises a fourth compressor, and wherein the third compressor row comprises a fifth compressor.

24. The circuit of claim 22, wherein each of the plurality of compressors is 72 bits wide.

25. The circuit of claim 21, wherein the width of each compressor C in the plurality of compressors is equal to the sum of the widths of the inputs of compressor C.

26. The circuit of claim 21, wherein each of the inputs of each of the plurality of compressors is at least 64 bits wide.

27. The circuit of claim 21, wherein the first compressor row comprises a first compressor, a second compressor, and a third compressor, and wherein the second compressor row comprises a fourth compressor.

28. The circuit of claim 21, wherein the plurality of compressors comprises a plurality of 4-2 compressors.

29. The circuit of claim 21, wherein the plurality of compressors comprises a plurality of carry save adders.

30. A circuit comprising:
a plurality of 4-2 compressors having a plurality of inputs a plurality of outputs, each of the plurality of 4-2 compressors comprising at least one carry save adder, each of the plurality of inputs being at least 64 bits wide;
a first compressor row comprising a first subset of the plurality of 4-2 compressors, the inputs of the first subset of the plurality of 4-2 compressors being wired in parallel to receive a plurality of distinct inputs, the first compressor row comprising a first compressor, a second compressor, and a third compressor;
a second compressor row comprising a second subset of the plurality of 4-2 compressors, outputs of the first subset of the plurality of 4-2 compressors being coupled to inputs of the second subset of the plurality of 4-2 compressors, the second compressor row comprising a fourth compressor; and
a third compressor row comprising a third subset of the plurality of compressors, outputs of the second subset of the plurality of compressors being coupled to inputs of the third subset of the plurality of compressors, the third compressor row comprising a fifth compressor;
wherein all of the 4-2 compressors in the plurality of 4-2 compressors are 72 bits wide.

31. A circuit comprising:
a partial product generator comprising:
a first input to receive a multiplicand;
a second input to receive a multiplier;
partial product generation means for producing a plurality of partial products based on the multiplicand and the multiplier; and
an output coupled to the partial product generation means to provide the plurality of partial products; and
a partial product adder comprising:
an input coupled to the output of the partial product generator;
a plurality of adders to add the plurality of partial products to produce a final product, the plurality of adders comprising a plurality of compressors interconnected in a Wallace tree configuration and having substantially the same width; and
an output coupled to the plurality of adders to provide the final product.

32. The circuit of claim 31, wherein the plurality of adders comprises:
an adder array comprising a subset of the plurality of adders, a first output to produce a sum signal, and a second output to produce a carry signal, the subset of the plurality of adders comprising a plurality of carry save adders to sum the plurality of partial products to produce the sum signal and the carry signal; and
a full adder comprising a first input coupled to the first output of the adder array, a second input coupled to the second output of the adder array, means for adding the sum signal to the carry signal to produce the final product, and an output to provide the final product.

33. The circuit of claim 31, wherein the multiplier is at least 64 bits wide.

34. The circuit of claim 31, wherein the multiplicand is at least 64 bits wide.

35. The circuit of claim 31, wherein the width of each compressor C in the plurality of compressors is equal to the sum of the widths of the inputs of compressor C.

36. The circuit of claim 31, wherein each of the plurality of partial products is at least 64 bits wide.

37. The circuit of claim 31, wherein the plurality of compressors comprises a plurality of 4-2 compressors.

38. The circuit of claim 31, wherein the circuit comprises a first compressor row comprising a first subset of the plurality of compressors and a second compressor row comprising a second subset of the plurality of compressors, wherein compressors in the first subset have the same width as each other, and wherein compressors in the second subset have the same width as each other.

39. A circuit comprising:
a partial product generator comprising:
   a first input to receive a multiplicand that is at least 64 bits wide;
   a second input to receive a multiplier that is at least 64 bits wide;
   partial product generation means for producing a plurality of partial products based on the multiplicand and the multiplier; and
   an output coupled to the partial product generation means to provide the plurality of partial products; and a partial product adder comprising:
   an input coupled to the output of the partial product generator;
   a plurality of adders to add the plurality of partial products to produce a final product, the plurality of adders comprising a plurality of 4-2 compressors interconnected in a Wallace tree configuration and having substantially the same width; and
   an output coupled to the plurality of adders to provide the final product; and a first compressor row comprising a first subset of the plurality of compressors and a second compressor row comprising a second subset of the plurality of compressors, wherein compressors in the first subset have the same width as each other, and wherein compressors in the second subset have the same width as each other.

* * * * *

UNITED STATES PATENT AND TRADEMARK OFFICE
CERTIFICATE OF CORRECTION

| | | |
|---|---|---|
| PATENT NO. | : 7,313,585 B2 | Page 1 of 1 |
| APPLICATION NO. | : 10/652899 | |
| DATED | : December 25, 2007 | |
| INVENTOR(S) | : Paul W. Winterrowd | |

It is certified that error appears in the above-identified patent and that said Letters Patent is hereby corrected as shown below:

In column 1, line 37, delete "lob" and insert -- 110b --, therefor.

Signed and Sealed this

Twenty-seventh Day of May, 2008

JON W. DUDAS
*Director of the United States Patent and Trademark Office*